United States Patent [19]
Cohn et al.

[11] 3,929,317
[45] Dec. 30, 1975

[54] VALVE ASSEMBLY

[75] Inventors: Lawrence P. Cohn, Clarkston; Dennis W. Crawford, Pontiac; Larry G. Turner, Waterford, all of Mich.

[73] Assignee: Bristol Products, Inc., Bristol, Ind.

[22] Filed: Jan. 20, 1975

[21] Appl. No.: 542,279

[52] U.S. Cl. ............... 251/223; 251/225; 251/288
[51] Int. Cl.² .......................................... F16K 31/44
[58] Field of Search .......... 251/214, 215, 218, 221, 251/223, 225, 284, 287, 288

[56] References Cited
UNITED STATES PATENTS

| | | | |
|---|---|---|---|
| 2,621,890 | 12/1952 | Young | 251/284 |
| 2,630,291 | 3/1953 | Gifford et al. | 251/223 |
| 3,327,992 | 6/1967 | Billeter et al. | 251/215 |
| 3,448,961 | 6/1969 | Enssle | 251/288 |
| 3,523,551 | 8/1970 | Schmitt | 251/214 |

FOREIGN PATENTS OR APPLICATIONS 1,157,576   7/1969   United Kingdom............... 251/221

*Primary Examiner*—Irwin C. Cohen
*Assistant Examiner*—George L. Walton
*Attorney, Agent, or Firm*—Oltsch & Knoblock

[57] ABSTRACT

A valve which is connected to an attachment part by means of a retainer which extends through the bonnet of the valve and attachment part to prevent rotative movement of the bonnet relative to the body of the valve. The retainer includes a stop which serves to limit opening and closing of the valve.

7 Claims, 12 Drawing Figures

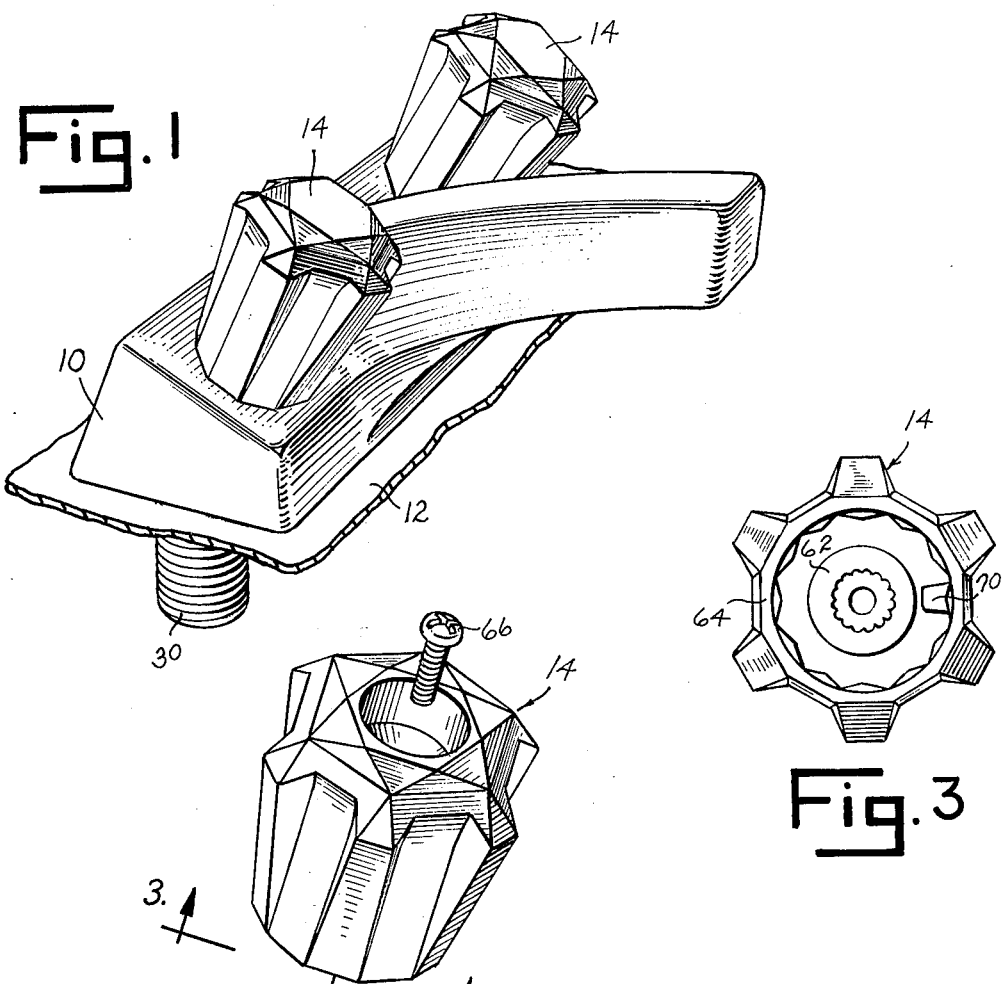
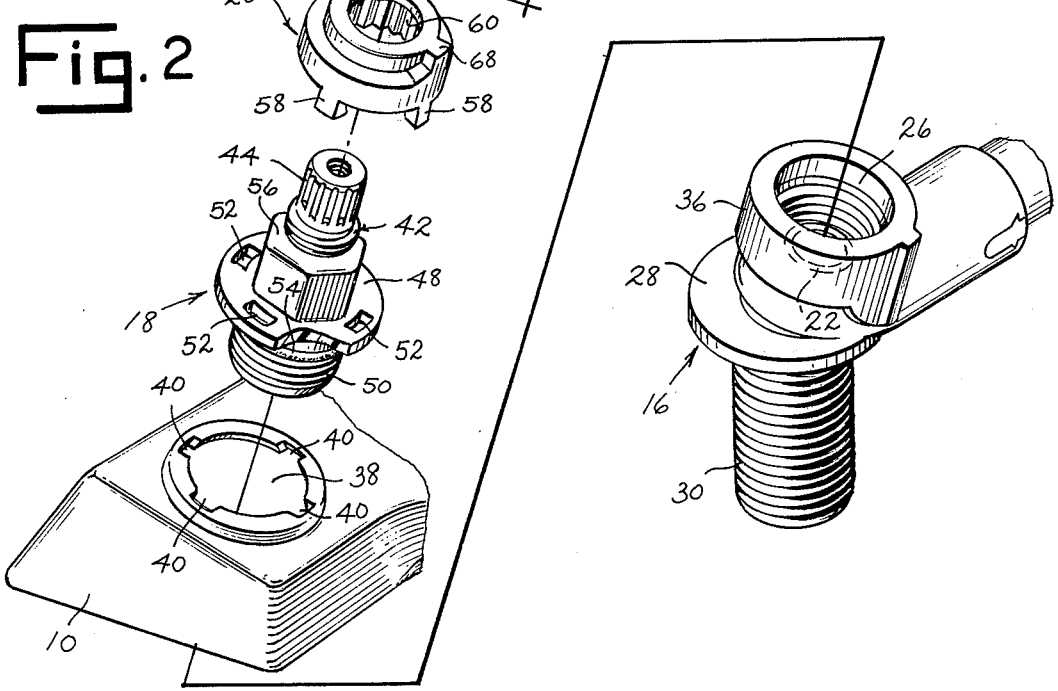

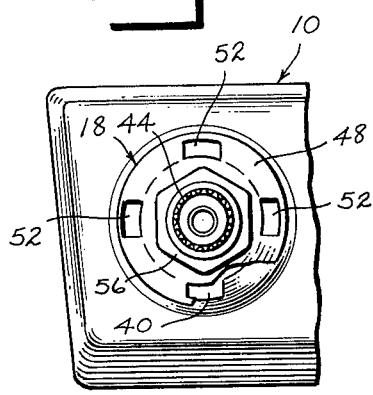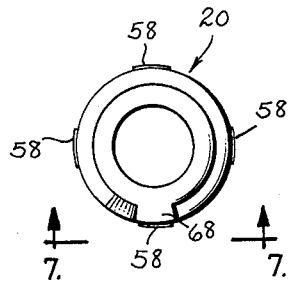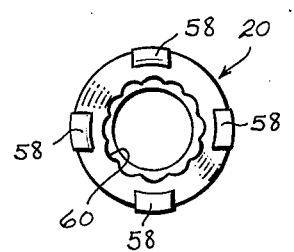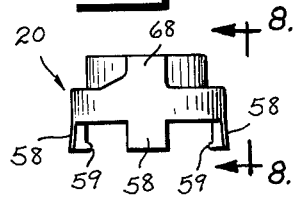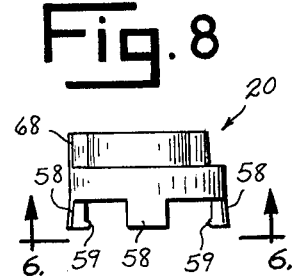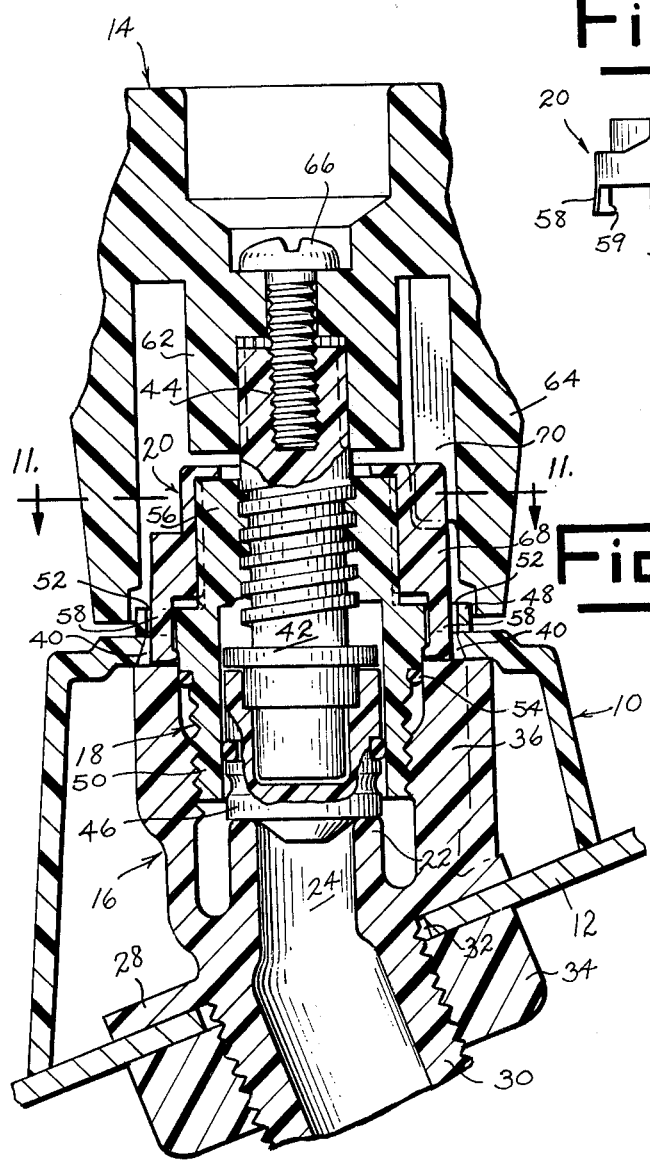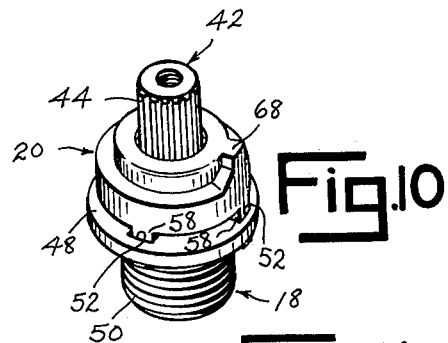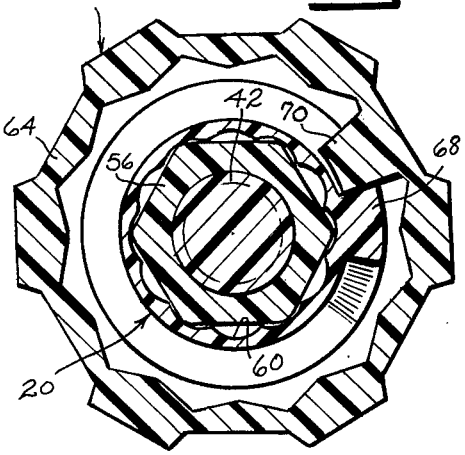

3,929,317

VALVE ASSEMBLY

BACKGROUND OF THE INVENTION

The subject invention relates to a valve assembly and the means of connecting the valve component of the assembly to an attachment part, such as a faucet cover plate, underlying basin, vanity or sink top.

A majority of valve constructions are made of brass, which due to its strength enables the valve body and bonnet to be assembled together and attached to the basin or sink by means of threaded members. To prevent the valve user from accidentally loosening or disassembling the metallic valve body and bonnet by overturning the valve stem it is customary to apply a torque of up to 200 inch-pounds to the bonnet in connecting it to the body. Recently valve bodies and bonnets have also been constructed of plastic materials, such as acetal copolymer, acetal homopolymer and acrylonitrile butadine styrene. To assemble a plastic valve bonnet and body in the same manner as a brass or other metallic bonnet and body through the use of an applied high torque would place a significant stress upon the bonnet and other component parts of the valve. This stress could result in distortion of the valve parts and even failure of the valve.

In the subject invention the valve parts are assembled in a unique manner which leaves the valve in its assembled form in a substantially stress free condition.

SUMMARY OF THE INVENTION

The valve assembly of this invention includes retainer means which is placed over the bonnet of the valve and which interlocks with the bonnet and either an attachment part, such as a cover plate, sink, basin or vanity top, or the valve body, to prevent rotation of the bonnet relative to the body. Additionally, the retainer means may include a stop which serves to limit rotative movement of the handle connected to the stem of the valve, thereby preventing stripping or breaking of the valve stem as well as disassembly of the stem from the valve should the valve be overclosed or overopened. Through the utilization of a retainer means to interlock with the valve bonnet and an attachment part or the valve body, the valve can be assembled and installed in a substantially stress free condition to prevent breaking or deformation of the component parts of the valve and malfunctioning of the valve.

Accordingly, it is an object of this invention to provide means for assembling a valve and securing the valve to an attachment part, such as a cover plate, vanity top, sink or basin, in a substantially stress free condition.

Another object of this invention is to provide a valve which is of economical construction and which can be connected to a support as a part of a faucet assembly in a rapid and simple manner.

Still another object of this invention is to provide a combination valve and support assembly in which overclosing and overopening of the valve is prevented.

A further object of this invention is to provide a valve having a valve body and bonnet which are formed of a molded plastic material and which can be assembled to a support means in a substantially stress free condition.

Other objects of this invention will become apparent upon a reading of the invention's description.

BRIEF DESCRIPTION OF THE DRAWINGS

FIG. 1 is a perspective view of a faucet assembly in which this invention is utilized.

FIG. 2 is a fragmentary perspective view of the component parts of the valve utilized in the faucet assembly of FIG. 1 shown in exploded form.

FIG. 3 is a view of the valve handle as seen from below along line 3—3 of FIG. 2.

FIG. 4 is a top plan view showing the bonnet of the valve overlying the faucet assembly cover plate with portions of the bonnet broken away for purposes of illustration.

FIG. 5 is a top plan view of the retainer member utilized in the faucet assembly.

FIG. 6 is a bottom view of the retainer member as seen from line 6—6 of FIG. 8.

FIG. 7 is a side view of the retainer member as seen along line 7—7 of FIG. 5.

FIG. 8 is a side view of the retainer member as seen along line 8—8 of FIG. 7.

FIG. 9 is an enlarged sectional view showing the valve in assembled form connected to an underlying support.

FIG. 10 is a perspective view of the valve bonnet having the retainer member fitted thereover.

FIG. 11 is a sectional view taken along line 11—11 of FIG. 9.

DESCRIPTION OF THE PREFERRED EMBODIMENTS

Figure 12:
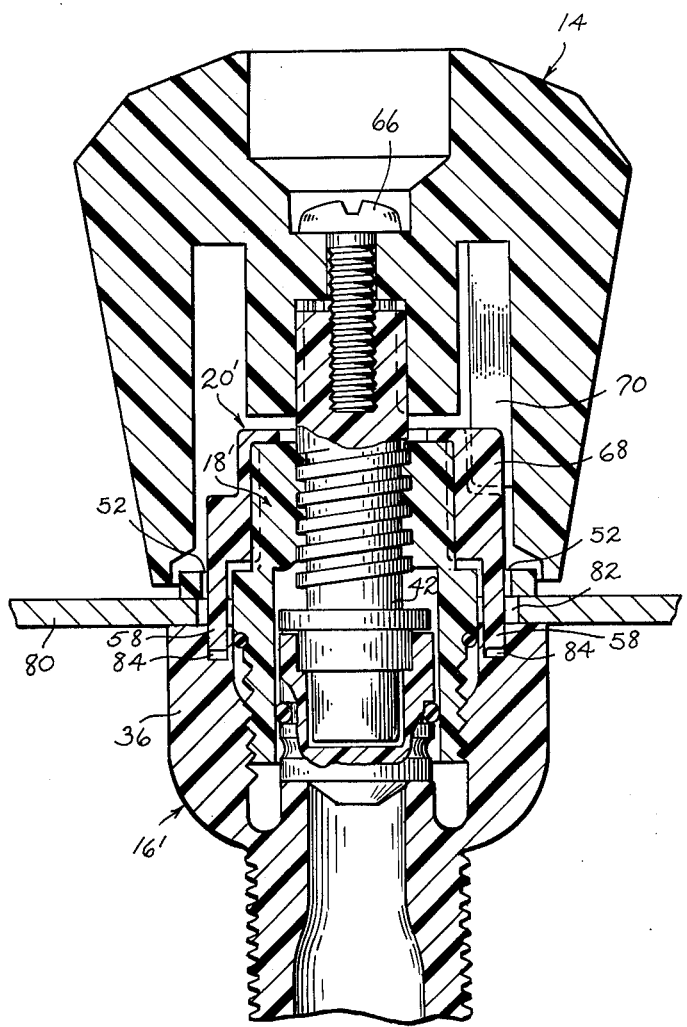
FIG. 12 is an enlarged sectional view showing the valve in its assembled form connected in a modified manner to an underlying support.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The assembly shown in FIG. 1 represents a faucet assembly in which a pair of valves are interconnected by a spout. The valves and spout are enclosed by a cover plate 10 which rests upon the horizontal flange 12 of a sink or basin. Handles 14 are connected to the valves to enable regulation of the flow of fluid such as hot and cold water through the faucet.

Each of the valves utilized in the faucet assembly of FIG. 1 includes, as best shown in FIGS. 2 and 9, a body 16, a bonnet 18, and a retainer member 20. These components of the valves as they are assembled serve to secure the valves to flange 12 of the sink or basin and to secure the cover plate 10 over the valves. A description of the manner in which this is accomplished follows.

Body 16 of the valves includes a valve seat 22 which defines an inlet 24 and an outlet 26 for fluid flow through the valve. Valve body 16 is formed with a mounting flange 28 from which a threaded projection 30 depends. Projection 30 extends through an opening 32 in flange 12 of the sink or basin. A nut 34 is turned upon projection 30 and is brought into contact with flange 12 to secure the valve body to the sink or basin. Tubing or piping (not shown) is suitably connected to projection 30 of each valve body 16 for the purpose of connecting the water of fluid supply source to the faucet assembly. Valve body 16 includes an annular side wall 36 which is internally threaded and which extends above valve seat 22. Cover plate 10 has an opening 38 formed therein for each of the valves utilized in the faucet assembly. Each opening 38 is interrupted about its marginal edge by a plurality of slots 40 and is aligned with the internally threaded opening defined by side wall 36 in a basin or sink secured valve body 16.

Bonnet 18 of the valve carries a stem 42. Stem 42 is splined at its upper end 44 and carries a valve closure 46 at its opposite end. When bonnet 18 is connected to valve body 16, rotation of stem 42 causes closure 46 to shift into and out of sealing engagement with seat 22 of the body. Bonnet 18 includes an annular flange 48 from which a threaded end portion 50 depends. Flange 48 has a plurality of slotted openings 52 formed in it. An O-ring 54 extends about threaded end portion 50 and is located against flange 48 of the bonnet. End portion 50 is inserted through an opening 38 in cover plate 10 and is threaded into a valve body 16 at the opening formed by its internally threaded side wall 36. The diameter of bonnet 18 across its flange 48 preferably exceeds the diameter of each cover plate opening 38 as measured across its slots 40 so that, as the bonnet is threaded into body 16, flange 48 will engage and press cover plate 10 into compressive engagement with the upper end of side wall 36 of the valve body. The bonnet is tightened into valve body 16 only sufficiently to snugly engage cover plate 10 and to align openings 52 with slots 40 in the cover plate. This alignment of bonnet openings 52 with cover plate slots 40 can be seen in FIG. 4. The upper end 56 of bonnet 18 has a multiple sided or nut-shaped configuration to facilitate threading of the bonnet into valve body 16 and also to secure retainer member 20 to the bonnet in a manner later to be explained in this description. O-ring 54 provides a fluid tight seal between the bonnet and valve body. The radial location of and angular spacing between slotted openings 52 in the bonnet preferably correspond to the radial location of and angular spacing between slots 40 in the cover plate so as to facilitate alignment of each opening 52 with a slot 40.

Retainer member 20, which is shown perspectively in FIG. 2 and in more detailed form in FIGS. 5-8, is utilized to prevent bonnet member 18 from rotating relative to cover plate 10 and valve body 16. Retainer member 20 is annular in shape and includes a plurality of depending tabs 58 which in this embodiment equal the number of openings 52 in bonnet 18. The interior face 60 of retainer member 20 is splined. Tabs 58 of the retainer member are flared outwardly, as best seen in FIGS. 7-9, for added strength. A rib 59 is preferably formed on the inner face of each tab at its free end. With bonnet 18 threaded into body 16 and overlying the marginal edge of cover plate opening 38, retainer member 20 is fitted over the bonnet with upper end 44 of stem 42 projecting upwardly through the retainer member and with the tabs 58 of the retainer member fitting downwardly through each aligned bonnet opening 52 and body slot 40. Tabs 58 of the retainer member are fitted into aligned openings 52 and slots 40 with ribs 59 of the tabs interlocking with the bonnet. At the same time tabs 58 of the bonnet are being fitted into aligned openings 52 and slots 40, the splined face 60 of the retainer member cooperatively engages the nut-shaped end 56 of the bonnet to additionally secure the retainer member against rotation relative to the bonnet.

A handle 14 is connected to the upper end 44 of each valve stem 42. Handle 14 includes a splined inner core 62 surrounded by a spaced annular side wall 64. Splined core 62 of the handle cooperatively engages the splined upper end 44 of the valve stem with the handle being secured to the stem by means of a screw 66 in a customary manner. Side wall 64 of the handle spacedly overlaps retainer member 20. The end face of core 62 is located adjacent retainer member 20 so that the retainer member is prevented from sliding off of bonnet 18 which would cause retainer member tabs 58 to be freed from aligned openings 52 and slots 40 in the bonnet and cover plate. Retainer member 20 is provided with a stop part 68. Additionally, each handle 14 is also provided with a stop part 70 which projects inwardly from its side wall toward its core 62. As a handle 14 is turned between a closed and fully opened position stop part 70 of the handle will engage stop part 68 of the retainer member to prevent the handle from being overclosed or overopened.

The torque required to thread bonnet 18 into body 16 need only be in the magnitude of from five to ten-inch pounds, since movement of the bonnet relative to the valve body and cover plate 10 during valve use will be prevented by retainer member 20. This interlock between retainer member 20 and valve bonnet 18 and an attachment part such as cover plate 10 allows the valve bonnet and body to be constructed of molded plastic material. Overstressing of the valve during its assembly and use is substantially prevented by use of retainer member 20 and stop parts 68 and 70 of the retainer member and handle 14 respectively. Additionally, nut 34 which is utilized to secure the valve body to flange 12 of the sink or basin need not be greatly tightened when two valves are utilized with a cover plate such as shown in FIG. 1. This is due to the fact that pivotal movement of one valve within its opening 32 in flange 12 is prevented by the cooperation of the other valve and sink flange.

It is comtemplated that in some constructions of this invention the valve body and bonnet can be clamped directly to the sink, basin or vanity top which will serve as the attachment part without the use of a cover plate. Such a construction is illustrated in FIG. 12. Flange 80 of the basin or sink is clamped between bonnet 18' and body 16' of the valve. The opening 82 in flange 80 through which bonnet 18' extends need not be slotted at its marginal edge. Valve body 16' has a plurality of slotted openings 84 formed in the upper end of its side wall 36. Openings 84 are aligned with openings 52 in the bonnet. Retainer member 20', when placed over bonnet 18', has its tabs 58 fitted into aligned openings 52 and 84 to prevent rotation of the bonnet relative to valve body 16'. Handle 14 is connected to valve stem 42 in the same manner by screw 66 and operates in the same way between open and closed limits through stop parts 68 and 70 as was described for the assembly embodiment of FIGS. 1-11.

It is to be understood that the invention is not to be limited to the details above given but may be modified within the scope of the appended claims.

What we claim is:

1. In combination, a valve and attachment part; said valve including a body, a bonnet, a valve seat, a stem carrying a closure member engageable with said seat upon rotation of said stem, and a handle connected to said stem; said attachment part having an opening therein to accommodate said valve; the improvement wherein one of said attachment part and body includes first slot means, said bonnet including a threaded part and second slot means, said body including a threaded part and being located at one side of said attachment part at said opening therein, said bonnet being located at the opposite side of said attachment part at its said opening with the stem projecting outwardly from said opposite attachment part side, the threaded part of said body interlocking with the threaded part of said bonnet to secure said body and bonnet to said attachment part, said first and second slot means being aligned, and retainer means extending into said aligned slot means for preventing rotation of said bonnet relative to said body.

2. The combination valve and attachment of claim 1 wherein said attachment part includes said first slot means, said retainer means also for preventing rotation of said bonnet relative to said attachment part.

3. The combination valve and attachment of claim 1 wherein said body includes said first slot means.

4. The combination valve and attachment part of claim 1 wherein said handle includes first stop means, said retainer means including second stop means located in the path of movement of said first stop means upon rotation of said handle and stem, said second stop means for limiting rotative movement of said handle between open and closed positions of said valve.

5. The combination valve and attachment of claim 4 wherein said retainer means overlies said bonnet, said handle overlying said retainer means and constituting means for preventing said retainer means from being withdrawn from said aligned slots.

6. The combination valve and attachment part of claim 5 wherein said retainer means is of a ring-like configuration and includes tab means, said retainer means encircling said stem with said tab means projecting into said aligned slot means.

7. The combination valve and attachment part of claim 6 wherein said bonnet includes a flange having said second slot means formed therein, said attachment part includes a cover plate resting upon a support adjacent the fluid receiving portion of a sink or basin, said valve extending through said support, means securing said body to said support, said bonnet flange overlyingly contacting said cover plate and urging said cover plate toward said support.

* * * * *